United States Patent Office 3,253,220
Patented May 24, 1966

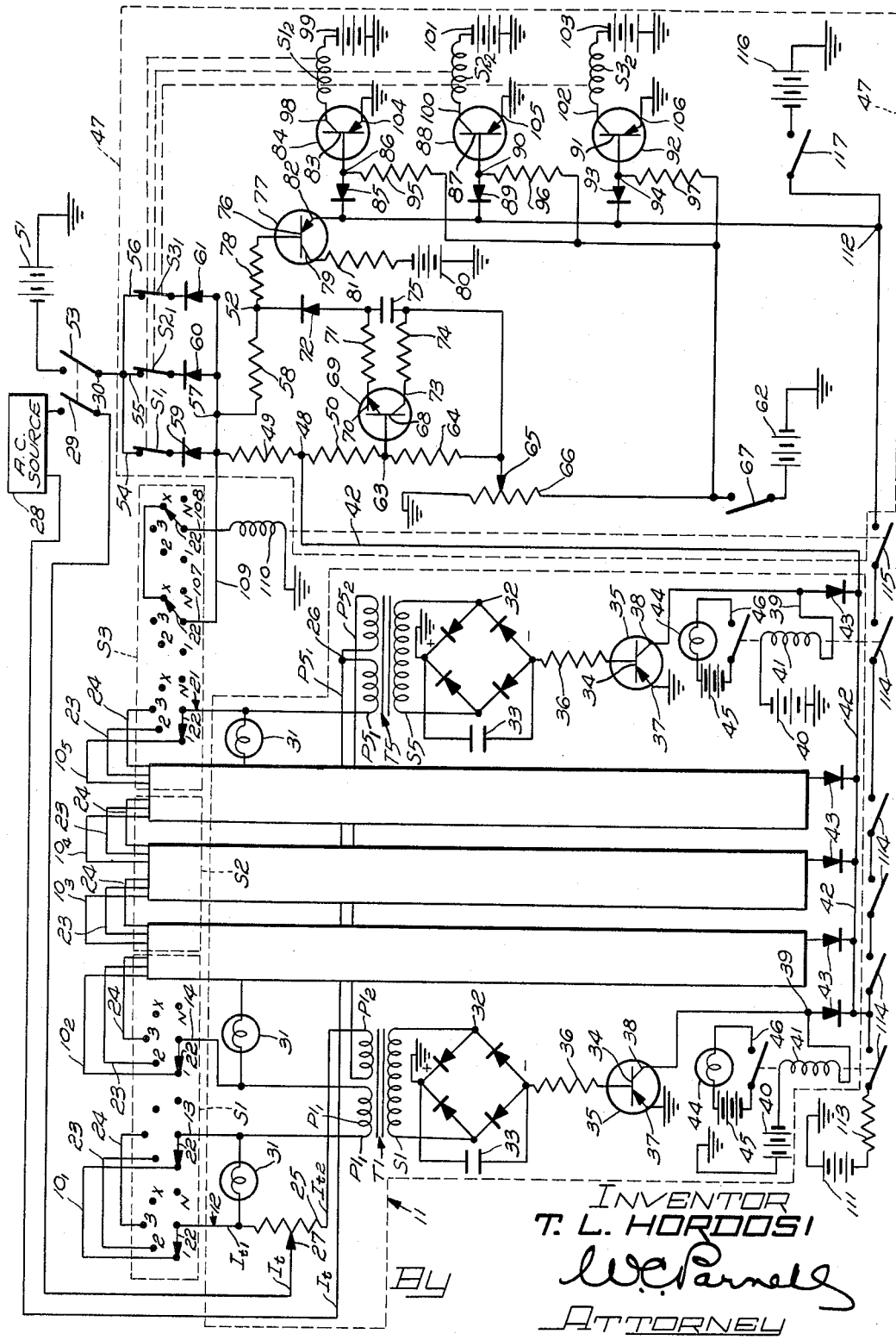

3,253,220
TEST APPARATUS INCLUDING BALANCED TRANSFORMERS FOR DETECTING OPENS, SHORTS AND REVERSALS
Theodore L. Hordosi, Berkeley Heights, N.J., assignor to Western Electric Company, Incorporated, a corporation of New York
Filed Oct. 6, 1961, Ser. No. 143,406
6 Claims. (Cl. 324—73)

This invention relates to the testing of electrical conductors and particularly to the automatic high-speed testing of successive groups of conductors wherein the conductors of a group are simultaneously tested for continuity and reversal.

The manufacture of telephone equipment requires that numerous connections be made between conductors and units of equipment. It is imperative to the efficient operation of the system that conductor connections are made accurately, that is, that each conductor is connected in the proper circuit path.

In practice it has been found that the incidence of errors in the connection of such conductors, that is, short, open or reversal conditions, is extremely low; however, since such conditions cannot be tolerated in a telephone system each conductor path must be tested and any detected error must be corrected. The usual way to check each conductor is to connect each conductor in a series circuit and apply a signal to the conductor. This may be done manually or automatically. In the manufacture of telephone equipment where great numbers of such conductors must be checked out, automatic apparatus for the sequential testing of conductors is now employed. However, most automatic checking systems test the conductors on a one at a time basis.

An object of the present invention is to provide a high-speed automatic apparatus for simultaneously testing a plurality of conductors for short, open and reversal condition.

Another object of the present invention is to provide a testing apparatus which sequentially connects successive groups of conductors in testing position and is adapted to respond to a fault condition in any conductor under test to identify any conductor having a fault condition and preclude further automatic operation of the apparatus.

A further object of the present invention is to provide a high-speed conductor continuity test apparatus which is programmed to periodically test its response to a conductor fault condition.

According to the general features of the invention, a group of conductors to be tested simultaneously are automatically connected into testing position by sequential advancing means. The conductors are series connected in one of two branches of a parallel circuit arranged so that an alternating testing current applied to the circuit results in equal and opposed currents in each branch. A fault condition of one or more conductors under test results in an unbalance of currents in the branches of the parallel circuit thus producing a signal which is used to indicate the faulty conductor and to preclude further operation of the sequential advancing means.

During normal operation, in the absence of a generated signal due to current unbalance in the parallel circuit, the sequential advancing means respond to simultaneously connect successive groups of conductors into testing position. A transistorized stepping circuit controls the plurality of sequential advancing means so that simultaneous connection of each conductor in a group into testing position is assured to compensate for mechanical differences between individual sequential advancing means.

At predetermined intervals, an open-conductor condition is programmed at each conductor testing position to constitute a periodic control checking of testing response.

According to a preferred embodiment of the invention, five conductors constitute a group to be simultaneously tested and three conventional stepping selector switches constitute the sequential advancing means. It is to be understood that any number of conductors may constitute a group and the choosing of the number five in a preferred embodiment is not to be construed as a limitation. The only proviso is that a complete group must be in testing position in order for the apparatus to function properly, that is, if less than a complete group is connected then an open-conductor condition will be presented where no conductor is in testing position. In this case, the apparatus will detect and indicate an open-conductor condition and will automatically stop further operation until the next group of conductors is connected in testing position through manual operation. It is further to be understood that any number of stepping selector switches may be utilized in accordance with the invention, so long as there are sufficient contact positions to accommodate the number of conductors which constitute a group.

The invention will be more fully understood from the following detailed description and by reference to the accompanying drawing which is a schematic diagram of an apparatus constructed and arranged according to a preferred embodiment of the invention.

The conductors $10_1$–$10_5$, comprising a first group of conductors to be tested, are connected in testing position in a fault-detection circuit 11 through the first contact position 1 of conventional stepping selector switches 12–21 having a plurality of contact positions N and the associated brushes 22. It is to be understood that the contact positions may be on separate selector switches or on separate banks of ganged selector switches; in the present embodiment the contact positions are on separate banks of three groups of selector switches S1, S2 and S3. Successive groups of conductors 23, 24 are likewise adapted to be connected in the fault-detection circuit 11 through successive contact positions 2, 3 of the selector switches.

A plurality of transformers T1–T5, equal in number to the number of conductors in a group to be tested, having their primary windings P1–P5 connected equally in phase opposition so that the primary windings $P1_1$–$P5_1$ are of one phase and the primary windings of $P1_2$–$P5_2$ are of the opposite phase. The primary windings $P1_2$–$P5_2$ are connected in series circuit from one side of the variable resistance 25 to junction point 26, which is the mid-point connection of the primary windings $P5_1$ and $P5_2$ of the last transformer T5. The primary windings $P1_1$–$P5_1$ are also connected in series circuit through the brushes 22, contact position 1 of the selector switches 12–21 and the conductors $10_1$–$10_5$ in testing position from junction point 26 to the other side of variable resistance 25.

Junction point 26 is connected to one side of alternating current source 28. Movable arm 27 of variable resistance 25 is connected to the other side of alternating current source 28 through contacts 29 of switch 30 which may be a conventional double-pole, single-throw switch.

Since the fault-detection circuit 11 includes identical circuits associated with each conductor $10_1$–$10_5$ in testing position, a full understanding of the invention may be had by showing only the fault-detection circuitry associated with the first $10_1$ and the last $10_5$ conductors in testing position.

High resistance means 31, which may conveniently be a lamp or meter, is connected across each conductor testing position to constitute a path for passing a reduced value of current whenever the conductor test position or a conductor in the test position is open.

Coupled to the secondary winding S1–S5 of each transformer of T1–T5, is a rectifier 32 which may advantageously be of the conventional full-wave bridge type. The positive side of rectifier 32 is connected to ground and a capacitor 33 is connected across the rectifier 32 to provide a smooth rather than pulsating direct current signal. The base 34 of transistor 35 is connected to the negative side of rectifier 32 through current limiting resistor 36. The emitter 37 of transistor 35 is connected to ground and the collector 38 is connected to junction point 39. Junction point 39 is connected to negative potential source 40 through the energizing coil of relay 41 and also to common control lead 42 through diode 43. Indicating means 44, which may conveniently be a lamp or meter is connected to direct current source 45 through one contact 46 of relay 41.

Common control lead 42 is connected to stepping circuit 47 at junction point 48 between resistance elements 49 and 50. A source of negative potential 51 is connected to junction point 52 through contacts 53 of switch 30 over one or more of paths 54, 55 and 56 to junction point 57 and through resistance element 58. Path 54 includes normally-closed interrupter contact $S1_1$ of selector switch S1 and diode 59; path 55 includes normally-closed interrupter contact $S2_1$ of selector switch S2 and diode 60; path 56 includes normally-closed interrupter contact $S3_1$ of selector switch S3 and diode 61.

Junction point 57 is also connected to positive potential source 62 through resistance element 49, junction point 48, resistance element 50, junction point 63, resistance element 64, movable arm 65 of variable resistance element 66 and switch 67 which may be a conventional locking toggle switch.

Base 68 of transistor 69 is connected to junction point 63; emitter 70 of transistor 69 is connected to junction point 52 through resistance element 71 and diode 72; collector 73 of transistor 69 is connected to movable arm 65 of variable resistance element 66 through resistance element 74; capacitor 75 is connected across resistance elements 71 and 74.

Base 76 of transistor 77 is connected to junction point 52 through resistance element 78; collector 79 of transistor 77 is connected to negative potential source 80 through current-limiting resistance element 81. Emitter 82 of transistor 77 is multipled to the base 83 of control transistor 84 through diode 85 and junction point 86; to the base 87 of control transistor 88 through diode 89 and junction point 90; and—to the base 91 of transistor 92 through diode 93 and junction point 94. Positive potential source 62 is also multipled to the base 83 of transistor 84 through junction point 86 and resistance element 95—to the base 87 of transistor 88 through junction point 90 and resistance element 96, and—to the base 91 of transistor 92 through junction point 94 and resistance element 97.

The collector 98 of transistor 84 is connected to negative potential source 99 through energizing coil $S1_2$ of selector switch S1; likewise, the collector 100 of transistor 88 is connected to negative potential source 101 through energizing coil $S2_2$ of selector switch S2, and the collector 102 of transistor 92 is connected to negative potential source 103 through energizing coil $S3_2$ of selector switch S3.

The emitters 104, 105 and 106 of transistors 84, 88 and 92 respectively are connected to ground.

Contact position X of selector switch 107 is connected to the identical contact position X of selector switch 108. These contact positions may be any desired contact position predetermined to coincide with the identical contact position X of the other selector switches or banks, which are adapted to have no conductors connected thereto. When the brushes 22 of all the selector switches are in predetermined contact position X, open-conductor condition is presented to each test position and a circuit is completed from direct current source 51 through one of paths 54, 55 or 56, junction point 57 and lead 109 through brush 22 of selector switch 107, in the position of contact X to contact X of selector switch 108 through brush 22 of selector switch 108 and through energizing coil of relay 110.

Negative potential source 111 is connected to junction point 112 through current limiting resistance 113, the series connected contacts 114 of relays 41 of the fault-detection circuitry associated with each conductor in testing position, and contact 115 of relay 110.

Negative potential source 116 is also connected to junction point 112 through switch 117 which may be a conventional non-locking key.

Junction point 112 is multipled to the base 83 of transistor 84 through diode 85 and junction point 86; to the base 87 of transistor 88 through diode 89 and junction point 90; and to the base 91 of transistor 92 through diode 93 and junction point 94.

Negative potential sources 51, 99, 101, 103, 110 and 116 may be derived from the same source.

*Normal operation*

The stepping selector switches are of the type such that when the coils $S1_2$, $S2_2$ and $S3_2$ of the selector switches are energized, the associated advancing mechanisms are cocked and the interrupter contacts $S1_1$, $S2_1$ and $S3_1$ are open.

When the interrupter contacts are open, the coils de-energize, the advancing mechanisms step the brushes to the next contact position and the interrupter contacts close.

Switch 67 is closed to complete a path from positive potential source 62 to base 68 of transistor 69 through a portion of variable resistance element 66, movable arm 65 and resistance element 64. A path is also completed from positive potential source 62 through a portion of variable resistance element 66 and movable arm 65 to capacitor 75, which becomes charged.

Transistor 69 is of the NPN type which becomes conductive when its base is forward biased positively. The positive potential applied to base 68 of transistor 69 makes transistor 69 conductive and completes a path through its collector-emitter junction, resistance elements 74 and 71 and diode 72 to place junction point 52 at slightly positive potential.

Transistor 77 is made conductive when its base 76 is forward biased negative thus, transistor 77 is reverse biased to cut-off by positive potential developed at its base 76 through resistance element 78 by the application of positive potential at junction point 52. Control transistors 84, 88 and 92 are also made conductive when their respective bases 83, 87 and 91 are forward biased negative thus, these transistors are reverse biased to cut-off by connecting the positive potential 62 to the bases through the respective resistance elements 95, 96 and 97 when switch 67 is closed.

Before the testing operation begins transistor 69 is conductive and transistors 77, 84, 88 and 92 are cut-off. Since control transistors 84, 88 and 92 are not conductive, selector switch coils $S1_2$, $S2_2$ and $S3_2$ are not energized, selector switch interrupter contacts $S1_1$, $S2_1$ and $S3_1$ are closed and the brush 22 of each selector switch 12–21, 107 and 108 is connected to its associated first contact position 1.

To start the testing operation switch 30 is closed to complete a path for testing current $I_t$ from alternating current source 28 through contact 30 to fault-detection circuit 11. Testing current $I_t$ flows through movable arm 27 and divides at preset potentiometer 25 into current $I_{t1}$ and $I_{t2}$. Current $I_{t1}$ flows from potentiometer 25 through the series circuit which includes the conductors $10_1$–$10_5$ under test and the primary windings $P1_1$–$P5_1$ to junction point 26; current $I_{t2}$ flows from potentiometer 25 through the series circuit which includes the primary windings $P1_2$–$P5_2$. If there is no conductor fault condition presented by the group of conductors $10_1$–$10_5$ under test, current $I_{t1}$ has a value equal to current $I_{t2}$ and these currents cancel out in the balanced opposing primary windings of transformers T1–T5 so no current is induced in the secondary windings S1–S5.

When switch 30 is closed, contacts 53 are closed to connect negative potential source 51 to junction point 57 of stepping circuit 47 through paths 54, 55 and 56. The value of resistance elements 49 and 50 are predetermined so that the placing of the negative potential at junction point 57 results in developing a negative potential at base 68 of transistor 69 thus reverse biasing of transistor 69 to cut-off. Capacitor 75 will become charged from the negative potential at junction point 57 through resistance element 58 and diode 72. When capacitor 75 is charged, a negative potential is placed at junction point 52 and is developed on base 76 of transistor 77 through resistance element 78.

Transistor 77 is made conductive when its base 76 is forward biased negative and connects negative potential source 80 to the bases 83, 87 and 91 of transistors 84, 88 and 92 respectively through current limiting resistance element 81, the collector-emitter junction of transistor 77 and paths including the associated diodes 85, 89 and 93.

The circuit parameters are such that the negative potential impressed on bases 83, 87 and 91 of transistors 84, 88 and 92 is greater than the positive potential placed at junction points 86, 90 and 94 by positive potential source 62, thus transistors 84, 88 and 92 are made conductive when their respective bases 83, 87 and 91 are forward biased negative. When conductive, transistor 84 provides a collector-emitter junction path to complete a circuit from negative potential source 99 through the energizing coil $S1_2$ of selector switch S1 to ground; likewise, conductive transistors 88 and 92 provide collector-emitter junction paths to complete circuits from negative potential sources 101 and 103 through energizing coils $S2_2$ and $S3_2$ of selector switches S2 and S3 to ground.

When the circuit through the energizing coil of any selector switch is completed, the advancing mechanism of the selector switch is cocked preparatory to stepping ahead when the coil is de-energized. To provide for simultaneous stepping ahead of all selector switches, the negative bias is maintained on the base 76 of transistor 77 so long as one of the pathes 54, 55 and 56 is completed from negative potential source 51 to junction point 57.

For example, if selector switch S3 is slower to respond than selector switches S1 and S2, the interrupter contacts $S1_1$ and $S2_1$ would be open when the advancing mechanisms of selector switches S1 and S2 are cocked in response to current flow through the energizing coils $S1_2$ and $S2_2$, but interrupter contacts $S3_1$ of selector switch S3 are still closed providing a path 56 between negative potential source 51 and junction point 57 whereby transistor 77 is maintained conductive by the forward bias negative and the control transistors 84, 88 and 92 are also maintained conductive by the forward bias negative. When the advancing mechanism of selector switch S3 is cocked interrupter contacts $S3_1$ will open; negative potential source 51 will be disconnected from junction point 57, transistor 77 will cut-off and remove the forward bias from control transistors 84, 88 and 92; the coils $S1_2$, $S2_2$ and $S3_2$ will de-energized and the advancing mechanisms of selector switches S1, S2 and S3 will step the brushes 22 ahead to the next contact positions 2 to connect the next succeeding group of conductors 23 into testing position.

Disconnection of negative potential source 51 from junction point 57 causes base 68 of NPN transistor 69 to become forward biased positive through resistor 64 and thus made conductive. When transistor 69 is conductive, capacitor 75 will rapidly discharge through low impedance path of resistor 71, the emitter-collector junction of transistor 69 and resistor 74. This returns junction point 52 to a positive potential level.

Open-conductor condition

In the event that one or more conductors $10_1$–$10_5$ under test should not constitute a continuous path between the contact positions 1 on the associated selector switches 12–21, the fault-detection circuit will sense the open, indicate it and generate a signal to which the stepping circuit will respond to preclude further operation of the selector switch advancing mechanisms.

For example, if conductor $10_1$ were open between contact position 1 of selector switch 12 and contact position 1 of selector switch 13, current $I_{t1}$ will be shunted around the open conductor $10_1$ and flow through and operate high resistance indicating means 31. The value of $I_{t1}$ is reduced due to the high resistance path through indicating means 31 and unbalance of currents $I_{t1}$ and $I_{t2}$ in the primary windings P1–P5 of each transformer T1–T5 induces a current in each secondary winding S1–S5.

The induced current in each secondary winding S1–S5 is rectified by rectifier 32 and a negative potential is placed on base 34 of transistor 35 through resistance element 36. Transistor 35 is forward biased to conduction by the negative potential on its base 34, thus completing a path through its emitter-collector junction and placing junction point 39 at ground potential. Negative potential source 40 is connected to ground through the energizing coil of relay 41 causing contact 46 to close thus connecting indicating means 44 to direct current source 45, which operates indicating means 44.

Negative potential source 51 is also connected to ground through a path which comprises contacts 53 of switch 30, one or more of paths 54, 55 or 56, junction point 57, resistance element 49, junction point 48, common control lead 42 and diode 43. Since negative potential source 51 is thus connected to ground, junction point 63 and base 68 of transistor 69 are made positive from potential source 62 and transistor 69 is forward biased positive to conduction. When transistor 69 is conductive, junction point 52 is placed at slightly positive potential and transistor 77 is reverse biased positive to cut-off.

With transistor 77 cut-off, the forward bias negative is removed from the bases 83, 87 and 91 of control transistors 84, 88, 92 respectively causing these transistors to cut-off. The selector switch coils $S1_2$, $S2_2$ and $S3_2$ are not energized thus the associated advancing means cannot be cocked; the apparatus is locked-off and further operation of stepping switches is precluded. Indicating means 31 directs the attention of the operator to the open conductor.

After the fault-condition is noted and/or corrected, the apparatus may be advanced to connect the next succeeding group of conductors 23 into testing position by instantaneous operation of non-locking switch 117. A negative potential source 116 is applied to the bases 83, 87 and 91 of control transistors 84, 88 and 92 through junction point 112 and associated diodes 85, 89 and 93 to forward bias the control transistors to conduction for an instant. When the control transistors 83, 88 and 92 become conductive, the selector switch coils $S1_2$, $S2_2$ and $S3_2$ are energized, the associated advancing means are cocked and selector switch interrupter contacts $S1_1$, $S2_1$ and $S3_1$ are opened thus disconnecting negative potential source 51 from common control lead 42. After switch 117 is released, negative potential 116 is removed from junction point 112, the control transistors 84, 88 and 92 are cut-off and the brushes 22 step to the next succeeding contact position 2 upon the release of the advancing mechanisms when the coils $S1_2$, $S2_2$ and $S3_2$ are de-energized. The apparatus is now ready for testing the next group of conductors 23 and negative potential source 51 is connected into the stepping circuit 47 through the closed interrupter contacts $S1_1$, $S2_1$ and $S3_1$ of paths 54, 55 and 56.

Short circuit condition

A short circuit condition between two of the conductors under test shunts out the primary windings $P_1$ of one or more of the transformers T1–T4. Consequently, the transformer or transformers with shunted primary windings $P_1$ will induce a current in the secondary windings S1 as a result of the current unbalance in the primary windings $P_1$ and $P_2$.

This error signal, rectified by the associated rectifier 32, forward biases the transistor 35 to conduction. The conductive transistor 35 connects ground to junction point 39 causing operation of indicating means 44 and precluding further operation of the apparatus as described above under "Open-conductor condition."

The indicating means 44 between the two shorted conductors will operate to indicate the faulty conductors. For example, if conductor $10_1$ is shorted by conductor $10_5$, the primary windings $P1_1$–$P4_1$ of transformers T1–T4 are shunted out and indicating means 44 associated with transformers T1–T4 will operate; if conductor $10_1$ is shorted with conductor $10_3$, the primary windings $P1_1$–$P2_1$ of transformers T1 and T2 will shunt out and indicating means 44 associated with transformers T1 and T2 will operate.

The apparatus is stepped ahead to test the next succeeding group of conductors 23 in accordance with the method described under "Open-conductor condition."

Reverse condition

A reverse condition of two conductors will act the same as a short circuit condition to indicate the faulty conductors and preclude further operation of the apparatus.

For example, if conductor $10_1$ is reversed with conductor $10_5$ then conductor $10_1$ will present a direct path from contact position 1 of selector switch 12 to contact position 1 of selector switch 21 and shunt out the primary windings $P1_1$–$P4_1$ of transformer T1–T4. The resulting unbalance of current in the primary windings of transformer T1–T4 permits induction of current in the secondary windings S1–S4 to stop the apparatus and operates associated indicating means 44 as previously described.

Self-checking operation

Since the detection of a fault is dependent upon positive action of the fault-detection circuit, it is important that the operability of the apparatus be checked periodically. For instance, a failure of alternating current source 28 or a failure of a component in the secondary of the transformer associated with a faulty conductor would result in a malfunction of the fault-detection circuitry and the apparatus would continue to operate without indicating a fault.

The operability of the apparatus is automatically checked by programming periodic open-conductor condition for each contact position X. When the brush 22 of selector switches 12–21 is connected to contact position X no conductors are connected in testing position. At the same time, brush 22 of selector switches 107 and 108 is also connected to contact position X to complete a circuit by which direct current source 51 energizes the coil of relay 110 and closes contact 115.

Contacts 114 of relays 41 are closed due to the conduction of transistors 35 in response to induced currents in the secondary windings S1–S5 of all transformers T1–T5 produced by an unbalance of currents in the primary windings P1–P5 when all contact test positions X are open, and a reduced value of current $I_{t1}$ flows through each indicating means 31. All indicating means 44 also operate in response to conduction of transistors 35.

When transistors 35 are conductive, negative potential source 51 is connected to ground and the further operation of the apparatus is precluded as described previously. However, so long as the apparatus is functioning properly all contacts 114 and contact 115 will close when the brushes 22 are in contact positions X and complete a path from negative potential source 111 to the bases 83, 87 and 91 of control transistors 84, 88 and 92 through current limiting resistance element 113 and junction point 112. This will forward bias the control transistors to conduction and allow the advancing mechanisms of selector switches S1, S2 and S3 to energize in preparation for stepping the brushes 22 to the next succeeding contact position.

When the selector switches S1, S2 and S3 are energized, contacts $S1_1$, $S2_1$ and $S3_1$ will open and remove the negative potential 51 from junction point 57 and relay 110, thus allowing relay 110 to release and open contact 115 to remove the negative potential 111 from junction point 112 and bases 83, 87 and 91 of control transistors 84, 88 and 92. This will return the control transistors 84, 88 and 92 to cut-off bias and allow selector coils $S1_2$, $S2_2$ and $S3_2$ to deenergize thus stepping the brushes 22 to the next succeeding contact position.

In the event that there is a malfunction of the fault-detection circuit, one or more of contacts 114 will not close and further operation of the apparatus is precluded. When this occurs, only the conductor groups tested since the next previous programmed checking operation need be re-tested to determine whether a fault condition escaped detection.

Conventional stepping selector switch hunting circuits may be readily adapted to the apparatus to provide a means for re-aligning the brushes 22 of the selector switches S1, S2 and S3 on identical contact positions in the event that one or more brushes are out of synchronism due to rare incidences of mechanical failure in one of the stepping switches.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing successive groups of conductors wherein the conductors in a group are tested simultaneously, comprising a source of alternating testing current, a plurality of stepping selector switches for sequentially connecting successive groups of conductors into testing position, a stepping circuit including transistor means for simultaneously advancing the selector switches, a plurality of transformers equal in number to the number of conductors in a group under test each transformer having at least one set of phase-opposed primary windings, means for providing a balance potential across one of the primary windings of each transformer, means for alternately connecting the other like primary windings of each transformer to the conductors under test such that a different one of the conductors under test connects said other like primary windings, whereby when the conductors under test are without defect, essentially zero current is induced in the secondary winding, transistor means coupled to the secondary winding of each transformer and responsive to an induced current for applying a cut-off potential to the transistor means of the stepping circuit whereby further advancing of the selector switches is precluded, means responsive to an unbalance of testing current in the primary windings to indicate a defective conductor, and means for automatically checking the operability of the apparatus by presenting open-conductor condition at predetermined intervals.

2. In apparatus for simultaneously testing a plurality of conductors for continuity and reversal, a detection circuit for generating a signal in accordance with the detection of defective conductor condition, comprising a source of alternating testing current, a first and a second parallel circut means connected across the current source, means for connecting the conductors in series in said first circuit means, a plurality of transformers equal in number to the number of conductors under test and each having two primary windings and a secondary winding, means for alternately connecting one of the primary windings of each transformer to the conductors under test, the second primary of each transformer being connected to the second circuit means such that when the conductors under test are without defect, essentially zero current is induced in said secondary winding, indicating means connected in parallel with each conductor and responsive to a defective conductor condition to unbalance the testing current in the primary windings and induce a current in the secondary windings, means including a rectifier and a transistor coupled to the secondary windings of each transformer responsive to an induced current in the secondary winding for generating a signal in accordance with the detection of a defective conductor condition to preclude further operation of the apparatus.

3. An apparatus for simultaneously testing a plurality of conductors for continuity and reversal comprising:
   a fault detection circuit including a plurality of transformers equal in number to the number of conductors under test, each transformer having a pair of primary windings, one of said windings being connected in series with the like primary winding of each other transformer and means for alternately connecting each of the other like primary windings of each transformer in series through the conductors under test, such that a different one of the conductors under test connects adjacent other like primary windings,
   means for serially connecting successive groups of conductors into a testing position in the fault detection circuit,
   means for applying an alternating testing current to the conductors under test, said current passing in phase opposition through each pair of primary windings,
   means responsive to a fault condition in at least one of the conductors under test for indicating said fault and generating a signal in the fault detection circuit,
   a stepping circuit for automatically and simultaneously advancing the means for connecting successive groups of conductors in the fault detection circuit,
   means responsive to the generated signal for precluding the stepping circuit from further operation, and
   means for periodically programming an open-conductor condition for all testing positions to check the operability of the apparatus.

4. An apparatus for simultaneously testing a plurality of conductors for continuity and reversal comprising:
   a fault detection circuit including a plurality of transformers equal in number to the number of conductors under test, each transformer having a secondary winding and a pair of primary windings, one of said primary windings being connected in series with the like primary winding of each other transformer and means for alternately connecting each of the other like primary windings of each transformer in series through the conductors under test, such that a different one of the conductors under test connects adjacent other like primary windings,
   means for serially connecting successive groups of conductors into a testing position in the fault detection circuit,
   means for applying an alternating testing current to the conductors under test, said current passing in phase opposition through each pair of primary windings,
   means responsive to a fault condition in at least one of the conductors under test for indicating said fault and generating a signal in the fault detection circuit,
   a stepping circuit connected to the secondary of each transformer for automatically and simultaneously advancing the means for connecting successive groups of conductors in the fault detection circuits,
   means responsive to the generated signal for precluding the stepping circuit from further operation, and
   means for periodically programming open-conductor condition for all testing positions to check the operability of the apparatus.

5. An apparatus for simultaneously testing a plurality of conductors for continuity and reversal comprising:
   a fault detection circuit including a plurality of transformers equal in number to the number of conductors under test, each transformer having a secondary winding and a pair of primary windings, one of said primary windings being connected in series with the like primary winding of each other transformer and means for alternately connecting each of the other like primary windings of each transformer in series through the conductors under test, such that a different one of the conductors under test connects adjacent other like primary windings,
   means for serially connecting successive groups of conductors into a testing position in the fault detection circuit,
   means for applying an alternating testing current to the conductors under test, said current passing in phase opposition through each pair of primary windings,
   means responsive to a fault condition in at least one of the conductors under test for indicating said fault and generating a signal in the fault detection circuit including rectifying means connected to the secondary of each transformer, a transistor coupled to the output of each rectifying means, and a relay operated by the transistor when conductive actuating the indicating means to signify an open circuit condition,
   a stepping circuit connected to the secondary of each transformer for automatically and simultaneously advancing the means for connecting successive groups of conductors in the fault detection circuits,
   means responsive to the generated signal for precluding the stepping circuit from further operation, and
   means for periodically programming open-conductor condition for all testing position to check the operability of the apparatus.

6. An apparatus for simultaneously testing a plurality of conductors for continuity and reversal comprising:
   a fault detection circuit including a plurality of transformers equal in number to the number of conductors under test, each transformer having a pair of primary windings, one of said windings being connected in series with the like primary winding of each other transformer and means for alternately connecting each of the other like primary windings of each transformer in series through the conductors under test, such that a different one of the conductors under test connects adjacent other like primary windings,
   means for serially connecting successive groups of conductors into a testing position in the fault detection circuit,
   means for applying an alternating testing current to the conductors under test, said current passing in phase opposition through each pair of primary windings,
   means responsive to a fault condition in at least one of the conductors under test for indicating said fault and generating a signal in the fault detection circuit,
   a stepping circuit for automatically and simultaneously advancing the means for connecting successive groups of conductors in the fault detection circuit, and
   means responsive to the generated signal for precluding the stepping circuit from further operation.

(References on following page)

References Cited by the Examiner

UNITED STATES PATENTS

| | | | |
|---|---|---|---|
| 2,545,551 | 3/1951 | Koch | 324—73 X |
| 2,844,250 | 7/1958 | Bayha et al. | 324—73 X |
| 2,950,437 | 8/1960 | Stahl | 324—73 |
| 3,047,799 | 7/1962 | Peer et al. | 324—54 |
| 3,135,913 | 6/1964 | Hodgdon | 324—51 X |

OTHER REFERENCES

Electronic Design, Garthwaite, vol. 5, Sept. 15, 1957, pages 38–41.

WALTER L. CARLSON, *Primary Examiner.*

G. S. KINDNESS, E. L. STOLARUN,
*Assistant Examiners.*